United States Patent
Kim et al.

(10) Patent No.: US 12,207,231 B2
(45) Date of Patent: Jan. 21, 2025

(54) METHOD AND APPARATUS FOR PAGING HANDLING IN WIRELESS COMMUNICATION SYSTEM

(71) Applicant: LG Electronics Inc., Seoul (KR)

(72) Inventors: Hongsuk Kim, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/985,395

(22) Filed: Nov. 11, 2022

(65) Prior Publication Data

US 2023/0085273 A1    Mar. 16, 2023

Related U.S. Application Data

(63) Continuation of application No. PCT/KR2021/012681, filed on Sep. 16, 2021.

(30) Foreign Application Priority Data

Sep. 16, 2020 (KR) .................. 10-2020-0118914

(51) Int. Cl.
*H04W 68/02* (2009.01)
*H04W 8/18* (2009.01)
(Continued)

(52) U.S. Cl.
CPC ........... *H04W 68/02* (2013.01); *H04W 8/183* (2013.01); *H04W 76/10* (2018.02); *H04W 76/38* (2018.02)

(58) Field of Classification Search
CPC ..... H04W 88/06; H04W 68/02; H04W 8/183; H04W 60/005; H04W 76/27;
(Continued)

(56) References Cited

U.S. PATENT DOCUMENTS

| 2015/0098445 | A1   | 4/2015  | Chakravarthy |
|---|---|---|---|
| 2016/0014579 | A1 * | 1/2016  | Kasilya Sudarsan ........................ H04W 76/15 455/553.1 |
| 2016/0331232 | A1 * | 11/2016 | Love .................. A61B 5/14532 |
| 2020/0029237 | A1 * | 1/2020  | Kim ...................... H04W 24/10 |
| 2020/0304984 | A1 * | 9/2020  | Dhanapal .............. H04W 76/19 |

(Continued)

FOREIGN PATENT DOCUMENTS

WO    WO-2020250548 A1 * 12/2020 .......... H04W 60/005
WO    WO-2020256489 A1 * 12/2020 .......... H04W 60/005
(Continued)

OTHER PUBLICATIONS

3GPP TR23.761 V0.4.0, Study on system enablers for devices having multiple Universal Subscriber Identity Modules (USIM), release 17, Jun. 2020, All Pages (Year: 2020).*
(Continued)

*Primary Examiner* — Matthew C Sams
(74) *Attorney, Agent, or Firm* — Fish & Richardson P.C.

(57) ABSTRACT

The present disclosure relates to a paging handling in wireless communications. According to an embodiment of the present disclosure, a method performed by a wireless device in a wireless communication system comprises: registering to a first network and a second network; establishing a connection with the first network; receiving, from the first network, information for a release timer; starting the release timer after receiving a paging from the second network; and upon an expiry of the release timer: releasing the connection with the first network without receiving a radio resource control (RRC) release message from the first network; and establishing a connection with the second network based on the paging from the second network.

14 Claims, 17 Drawing Sheets

(51) Int. Cl.
*H04W 76/10* (2018.01)
*H04W 76/38* (2018.01)

(58) Field of Classification Search
CPC ... H04W 76/15; H04W 68/005; H04W 60/00;
H04W 76/16; H04W 76/19; H04W 76/38;
H04W 76/30; H04W 24/10; H04W 36/14;
H04W 36/36; H04W 76/28; H04W 76/10
See application file for complete search history.

(56) References Cited

U.S. PATENT DOCUMENTS

| | | | | |
|---|---|---|---|---|
| 2020/0336887 | A1* | 10/2020 | Ou | H04W 8/24 |
| 2020/0359196 | A1* | 11/2020 | Balasubramaniam | H04W 72/30 |
| 2021/0014822 | A1* | 1/2021 | Gurumoorthy | H04W 68/02 |
| 2021/0051748 | A1* | 2/2021 | Xu | H04W 76/16 |
| 2022/0217636 | A1* | 7/2022 | Shrivastava | H04L 5/0055 |
| 2022/0279469 | A1* | 9/2022 | Ingale | H04W 60/005 |
| 2022/0286950 | A1* | 9/2022 | Kumar | H04W 60/005 |
| 2022/0330202 | A1* | 10/2022 | Kumar | H04W 60/00 |
| 2022/0369211 | A1* | 11/2022 | Agiwal | H04W 68/02 |
| 2023/0007623 | A1* | 1/2023 | Da Silva | H04W 24/08 |
| 2023/0047213 | A1* | 2/2023 | Chen | H04W 36/0022 |
| 2023/0051856 | A1* | 2/2023 | Comaravelou | H04W 60/00 |

FOREIGN PATENT DOCUMENTS

| | | | | |
|---|---|---|---|---|
| WO | WO-2022060120 | A1 * | 3/2022 | |
| WO | WO-2022250458 | A1 * | 12/2022 | H04W 60/005 |
| WO | WO-2023098654 | A1 * | 6/2023 | |

OTHER PUBLICATIONS

3GPP TR23.761 V0.4.0, Study on system enablers for devices having multiple Universal Subscriber Identity Modules (USIM), release 17, Jun. 2020, All Pages, No. Mark-up (Year: 2020).*

3GPP, "3rd Generation Partnership Project; Technical Specification Group Services and System Aspects; Study on system enablers for devices having multiple Universal Subscriber Identity Modules (USIM) (Release 17)," TR 23.761 V0.4.0, Jun. 2006, 78 pages.

3GPP, "3rd Generation Partnership Project; Technical Specification Group Radio Access Network; NR; User Equipment (UE) procedures in Idle mode and RRC Inactive state (Release 16)," TS 38.304 V16.1.0, Jul. 2020, 39 pages.

3GPP, "3rd Generation Partnership Project; Technical Specification Group Radio Access Network; NR; Medium Access Control (MAC) protocol specification (Release 16)," TS 38.321 V16.1.0, Jul. 2020, 151 pages.

3GPP, "3rd Generation Partnership Project; Technical Specification Group Radio Access Network; NR; Radio Resource Control (RRC) protocol specification (Release 16)," TS 38.331 V16.1.0, Jul. 2020, 906 pages.

MediaTek Inc., "Support for Multi-SIM Devices," R2-2007191, Presented at 3GPP TSG-RAN WG2 Meeting #111 electronic, Online, Aug. 17-28, 2020, 6 pages.

MediaTek Inc., "UE Indication for Transition out of RRC_Connected," R2-1908950, Presented at 3GPP TSG-RAN WG2 Meeting #107, Prague, Czech Republic, Aug. 26-30, 2019, 3 pages.

Qualcomm Incorporated & Comcast, "Solution for scheduling gap," S2-2004711 (was S2-2003895), SA WG2 Temporary Document, SA WG2 Meeting #139E, Jun. 1-12, 2020, Elbonia, 2 pages.

Vivo et al., "New WID: Support for Multi-SIM devices in Rel-17," RP-193263 (revision of RP-193250), Presented at 3GPP TSG RAN Meeting #86, Sitges, Spain, Dec. 9-12, 2019, 5 pages.

Office Action in Korean Appln. No. 10-2022-7040024, mailed on Aug. 22, 2023, 19 pages (with English translation).

Samsung, "KI #1, Sol #1: Update to clarify the UE and Network impacts.," S2-2005671, 3GPP TSG SA WG2, Meeting #140e, Electronic meeting, Aug. 19-Sep. 1, 2020, 7 pages.

Vivo, "KI#3, Sol#5: update to support more cases in MUSIM-RAI," S2-2003828, SA WG2 Meeting #139e, Elbonia, Jun. 1-12, 2020, 9 pages.

* cited by examiner

METHOD AND APPARATUS FOR PAGING HANDLING IN WIRELESS COMMUNICATION SYSTEM

CROSS-REFERENCE TO RELATED APPLICATIONS

Pursuant to 35 U.S.C. § 119(e), this application is a continuation of International Application PCT/KR2021/012681, with an international filing date of Sep. 16, 2021, which claims the benefit of Korean Patent Application No. 10-2020-0118914, filed on Sep. 16, 2020, the contents of which are hereby incorporated by reference herein in their entirety.

TECHNICAL FIELD

The present disclosure relates to a paging handling in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A user equipment (UE) in an idle mode may monitor a paging from a network. When the UE receives a paging from the network, the UE may identify that there is an incoming data towards the UE. To transit from the idle mode to a connected mode, the UE may perform a connection establishment procedure with the network. However, the UE may have an on-going service on another network after receiving a paging from the network.

SUMMARY

An aspect of the present disclosure is to provide method and apparatus for a paging handling in a wireless communication system.

Another aspect of the present disclosure is to provide method and apparatus for a paging handling in multi-universal subscriber identity module (MUSIM) operations in a wireless communication system.

Yet another aspect of the present disclosure is to release a connection with a network in MUSIM operations in a wireless communication system.

Yet another aspect of the present disclosure is to establish a connection with another network in MUSIM operations in a wireless communication system.

According to an embodiment of the present disclosure, a method performed by a wireless device in a wireless communication system comprises: registering to a first network and a second network; establishing a connection with the first network; receiving, from the first network, information for a release timer; starting the release timer after receiving a paging from the second network; and upon an expiry of the release timer: releasing the connection with the first network without receiving a radio resource control (RRC) release message from the first network; and establishing a connection with the second network based on the paging from the second network.

According to an embodiment of the present disclosure, a wireless device in a wireless communication system comprises: a transceiver; a memory; and at least one processor operatively coupled to the transceiver and the memory, and configured to: register to a first network and a second network; establish a connection with the first network; control the transceiver to receive, from the first network, information for a release timer; start the release timer after receiving a paging from the second network; and upon an expiry of the release timer: release the connection with the first network without receiving a radio resource control (RRC) release message from the first network; and establish a connection with the second network based on the paging from the second network.

According to an embodiment of the present disclosure, a processor for a wireless device in a wireless communication system executes instructions which are implemented by a software code stored in a memory of the wireless device. The instructions perform operations comprising: registering to a first network and a second network; establishing a connection with the first network; receiving, from the first network, information for a release timer; starting the release timer after receiving a paging from the second network; and upon an expiry of the release timer: releasing the connection with the first network without receiving a radio resource control (RRC) release message from the first network; and establishing a connection with the second network based on the paging from the second network.

According to an embodiment of the present disclosure, a non-transitory computer-readable medium has stored thereon a plurality of instructions. The plurality of instructions, when executed by a processor of a wireless device, cause the wireless device to: register to a first network and a second network; establish a connection with the first network; receive, from the first network, information for a release timer; start the release timer after receiving a paging from the second network; and upon an expiry of the release timer: release the connection with the first network without receiving a radio resource control (RRC) release message from the first network; and establish a connection with the second network based on the paging from the second network.

According to an embodiment of the present disclosure, a method performed by a base station (BS) in a first network in a wireless communication system comprises: performing at least part of a procedure for registering a wireless device in the first network and the second network; establishing a connection with the wireless device; and transmitting, to the wireless device, information for a release timer, wherein the release timer is started after the wireless device receives a paging from the second network, and wherein, upon an expiry of the release timer: the connection between the wireless device and the first network is released without transmitting a radio resource control (RRC) release message to the wireless device; and a connection between the wireless device and the second network is established.

According to an embodiment of the present disclosure, a base station (BS) in a first network in a wireless communication system comprises: a transceiver; a memory; and at least one processor operatively coupled to the transceiver and the memory, and configured to: perform at least part of a procedure for registering a wireless device in the first network and the second network; establish a connection with the first network; and control the transceiver to transmit, to the wireless device, information for a release timer, wherein the release timer is started after the wireless device receives a paging from the second network, and wherein, upon an expiry of the release timer: the connection between the wireless device and the first network is released without transmitting a radio resource control (RRC) release message to the wireless device; and a connection between the wireless device and the second network is established.

The present disclosure can have various advantageous effects.

For example, from the data interruption perspective, the present disclosure may have a benefit for multiple USIM handling when the UE cannot prioritize between two networks i.e., the first network and the second network. The UE can keep data transmission from the first network even though a paging message which requires the UE to switch from the first network to the second network is received from the second network until on-going data transmission is completed on the first network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
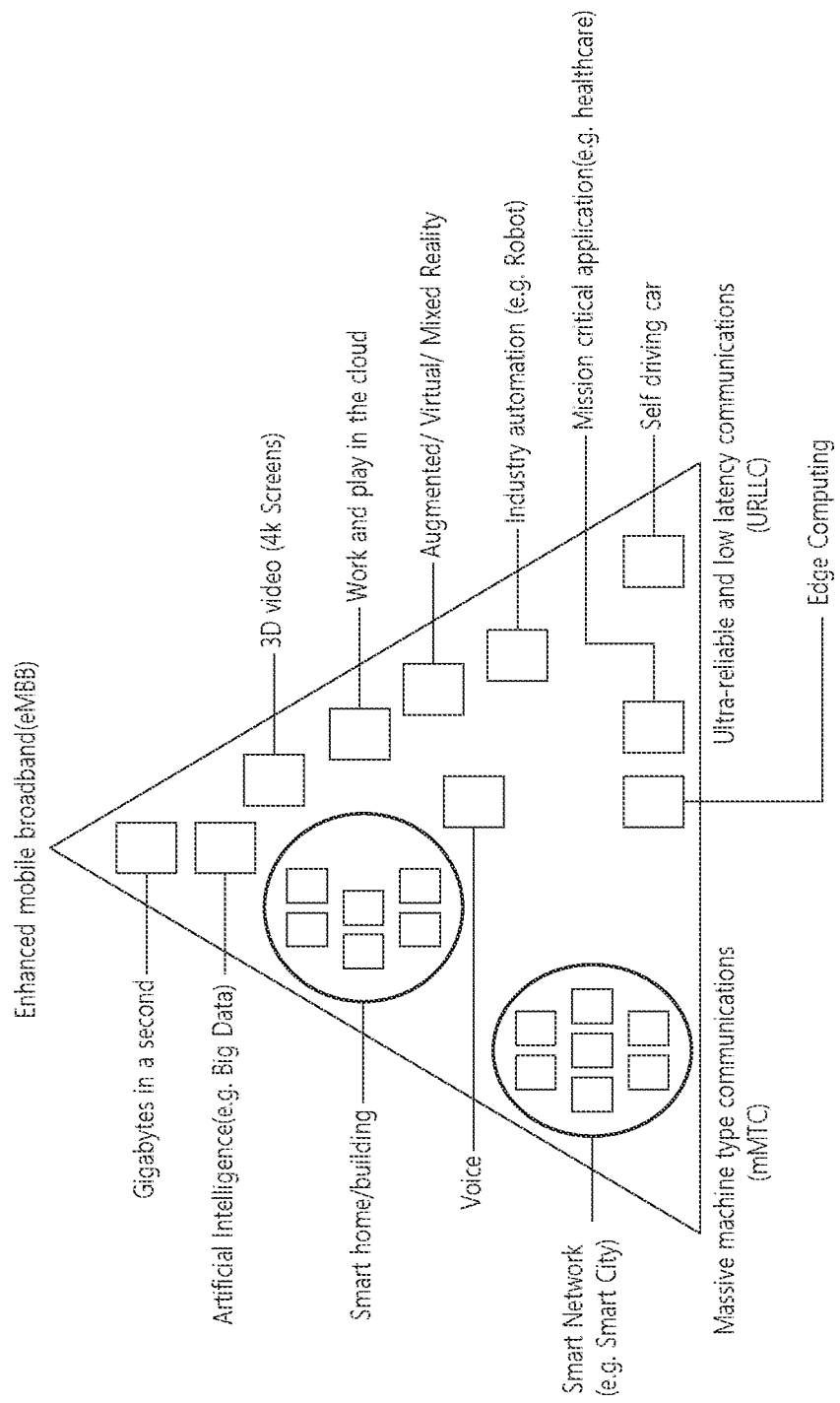
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
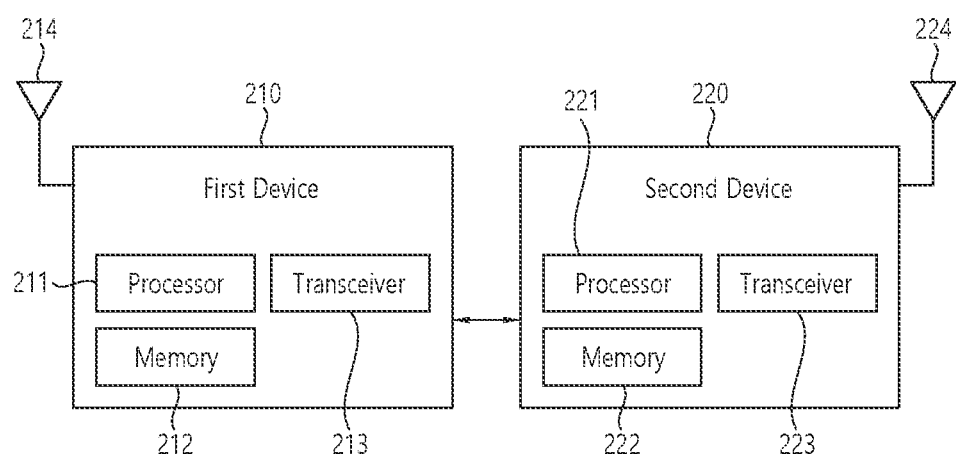
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
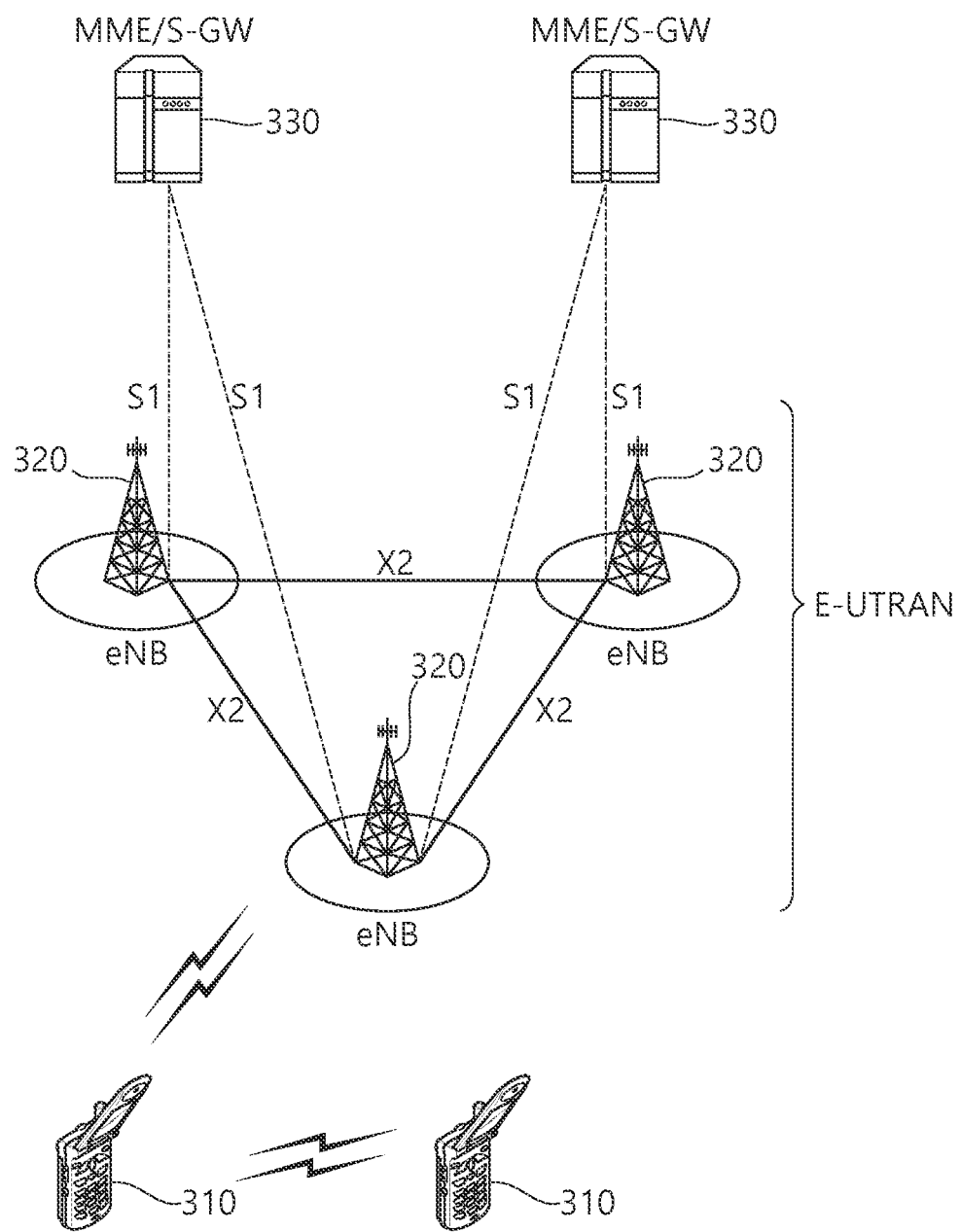
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UMTS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
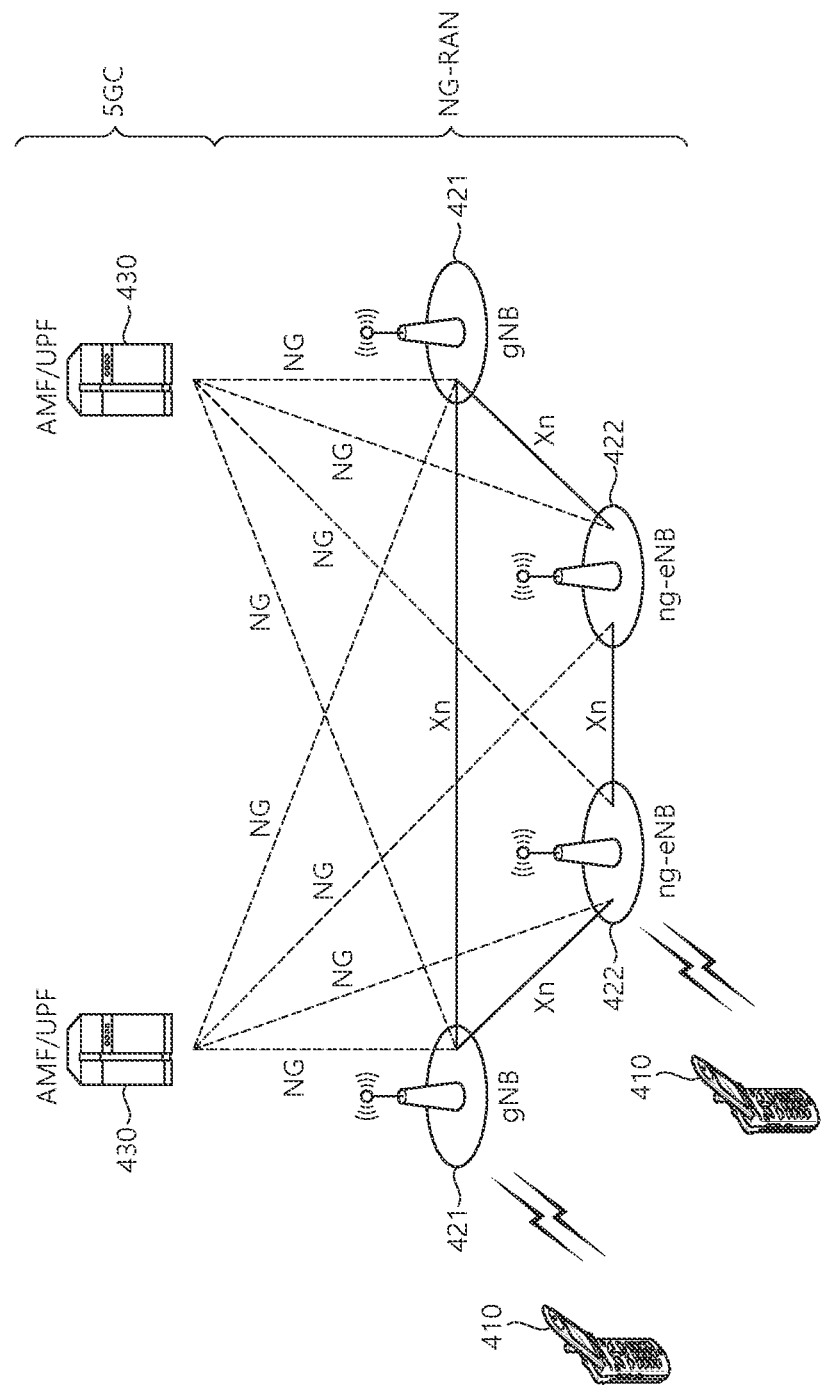
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
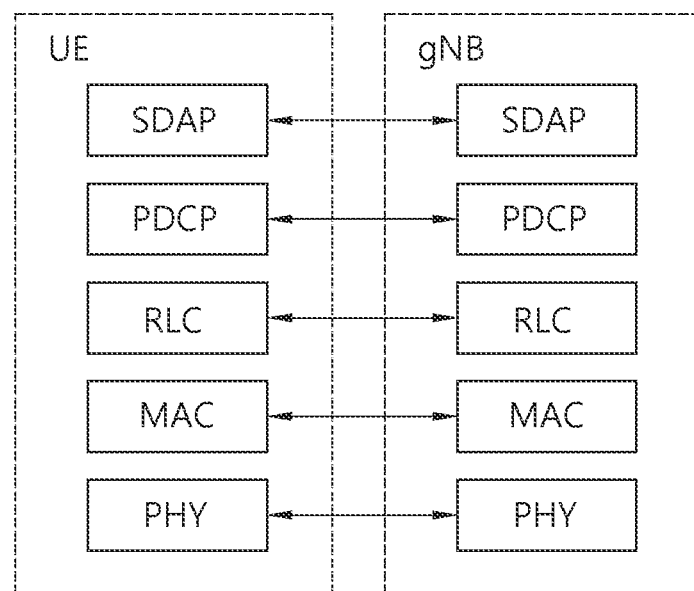
FIG. 5 shows a block diagram of a user plane protocol stack to which the technical features of the present disclosure can be applied.
Figure 6:
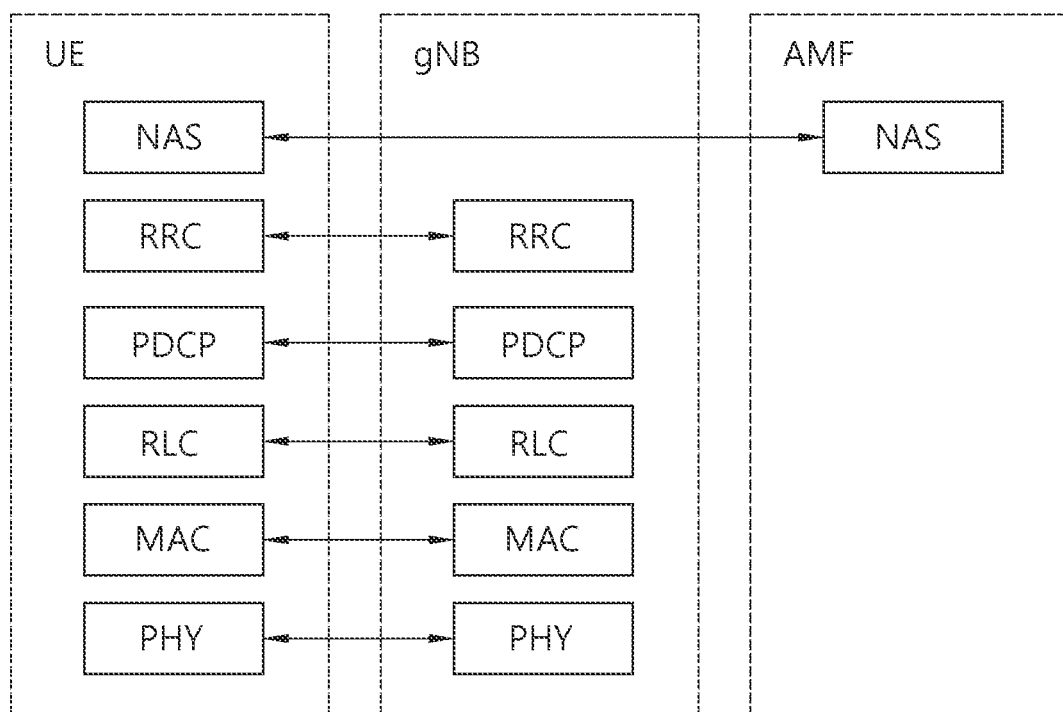
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell reselection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
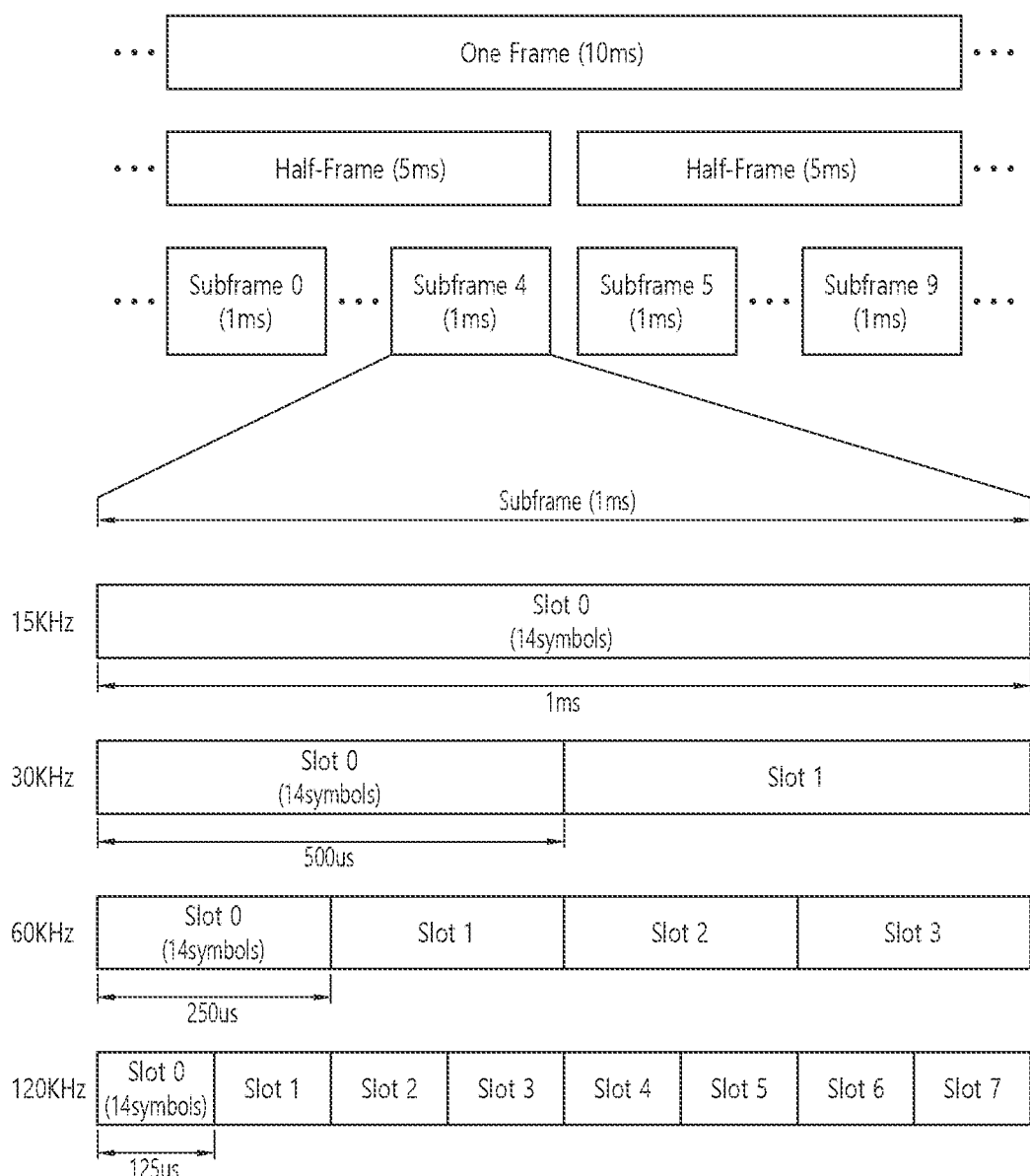
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2u*15$ kHz. The following table shows the number of OFDM symbols per slot, the number of slots per frame, and the number of slots per for the normal CP, according to the subcarrier spacing $\beta f=2u*15$ kHz.

TABLE 3

| u | Nslotsymb | Nframe,uslot | Nsubframe,uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\beta f=2u*15$ kHz.

TABLE 4

| u | Nslotsymb | Nframe,uslot | Nsubframe,uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs).

CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i-1, where i is the number of the bandwidth part. The relation between the physical resource block nPRB in the bandwidth part i and the common resource block nCRB is as follows; nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
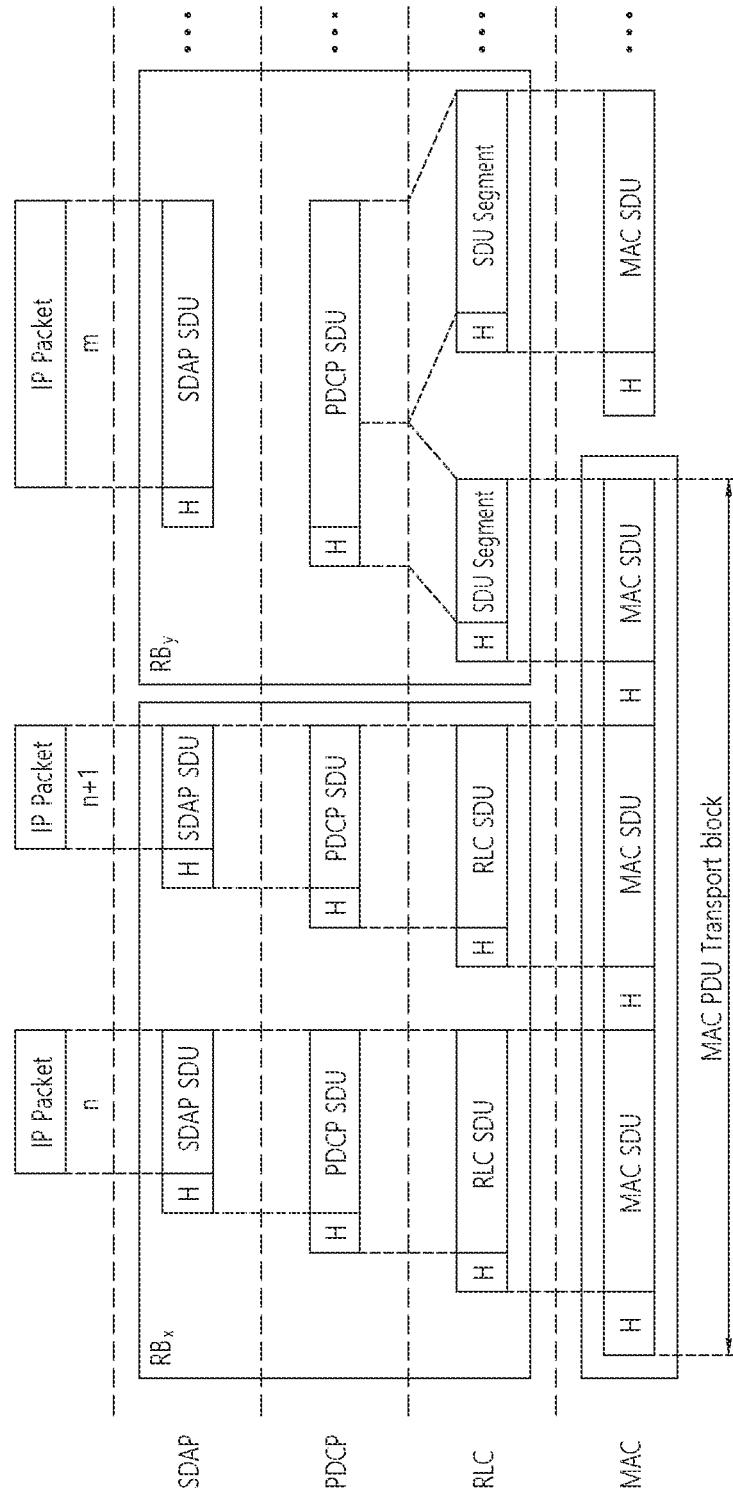
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s)(e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
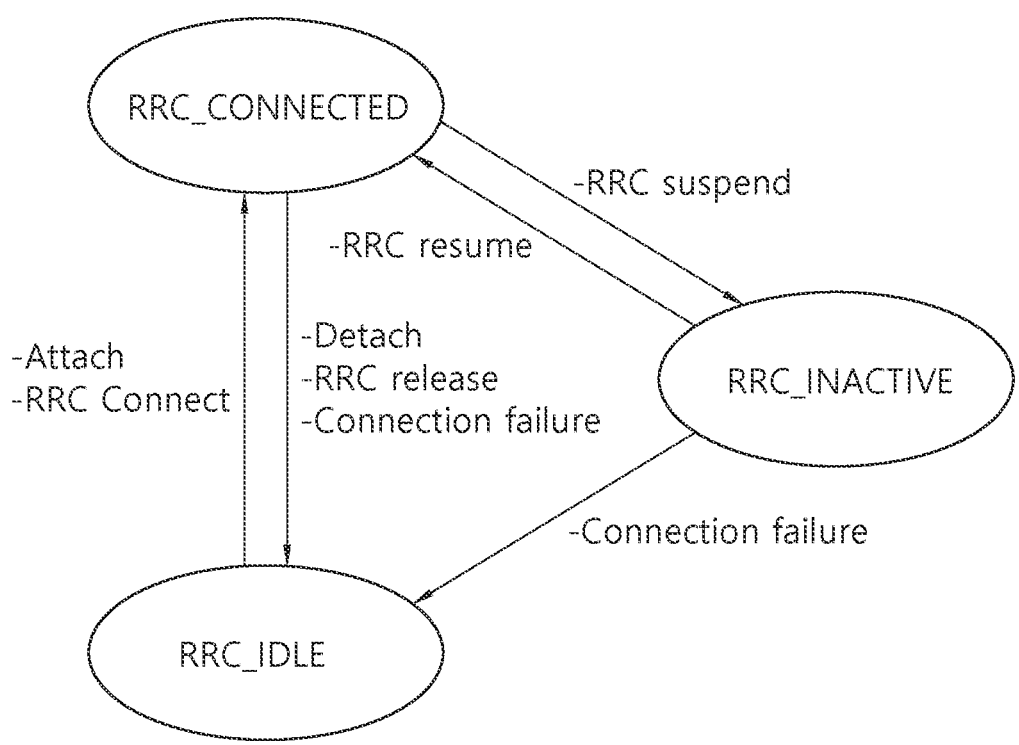
FIG. 9 shows an example of possible RRC states in a wireless communication system to which technical features of the present disclosure can be applied.

FIG. 9 shows an example of possible RRC states in a wireless communication system to which technical features of the present disclosure can be applied.

Referring to FIG. 9, there may be 3 possible RRC states in a wireless communication system (i.e., RRC_IDLE, RRC_CONNECTED and/or RRC_INACTIVE).

In RRC_IDLE (or, idle mode/state), RRC context for communication between a UE and a network may not be established in RAN, and the UE may not belong to a specific cell. Also, in RRC_IDLE, there is no core network connection for the UE. Since the device remains in sleep mode in most of the time to reduce battery consumption, data transfer between the UE and the network may not occur. UEs in RRC_IDLE may periodically wake-up to receive paging messages from the network. Mobility may be handled by the UE through cell reselection. Since uplink synchronization is not maintained, the UE may not perform uplink transmission other than transmissions for random access (e.g., random access preamble transmission) to move to RRC_CONNECTED.

In RRC_CONNECTED (or, connected state/mode), RRC context for communication between a UE and a network may be established in RAN. Also, in RRC_CONNECTED, core network connection is established for the UE. Since the UE belongs to a specific cell, cell-radio network temporary identifier (C-RNTI) for signalings between the UE and the network may be configured for the UE. Data transfer between the UE and the network may occur. Mobility may be handled by the network—that is, the UE may provide measurement report to the network, and the network may transmit mobility commands to the UE to perform a mobility. Uplink time alignment may need to be established based on a random access and maintained for data transmission.

In RRC_INACTIVE (or, inactive state/mode), RRC context for communication between a UE and a network may be kept in RAN. Data transfer between the UE and the network may not occur. Since core network connection may also be kept for the UE, the UE may fast transit to a connected state for data transfer. In the transition, core network signalling may not be needed. The RRC context may be already established in the network and idle-to-active transitions can be handled in the RAN. The UE may be allowed to sleep in a similar way as in RRC_IDLE, and mobility may be handled through cell reselection without involvement of the network. The RRC_INACTIVE may be construed as a mix of the idle state and the connected state.

As illustrated in FIG. 9, the UE may transit to RRC_CONNECTED from RRC_IDLE by performing initial attach procedure or RRC connection establishment procedure. The UE may transit to RRC_IDLE from RRC_CONNECTED when detach, RRC connection release (e.g., when the UE receives RRC release message) and/or connection failure (e.g., radio link failure (RLF)) has occurred. The UE may transit to RRC_INACTIVE from RRC_CONNECTED when RRC connection is suspended (e.g., when the UE receives RRC release message including a suspend configuration), and transit to RRC_CONNECTED from RRC_INACTIVE when RRC connection is resume by performing RRC connection resume procedure. The UE may transit to RRC_IDLE from RRC_INACTIVE when connection failure such as RLF has occurred.

Hereinafter, contents related to a multi-universal subscriber identity module (MUSIM) is described.

Multi-USIM devices (e.g., MUSIM device 1010) have been more and more popular in different countries. The user may have both a personal and a business subscription in one device or have two personal subscriptions in one device for different services.

Figure 10:
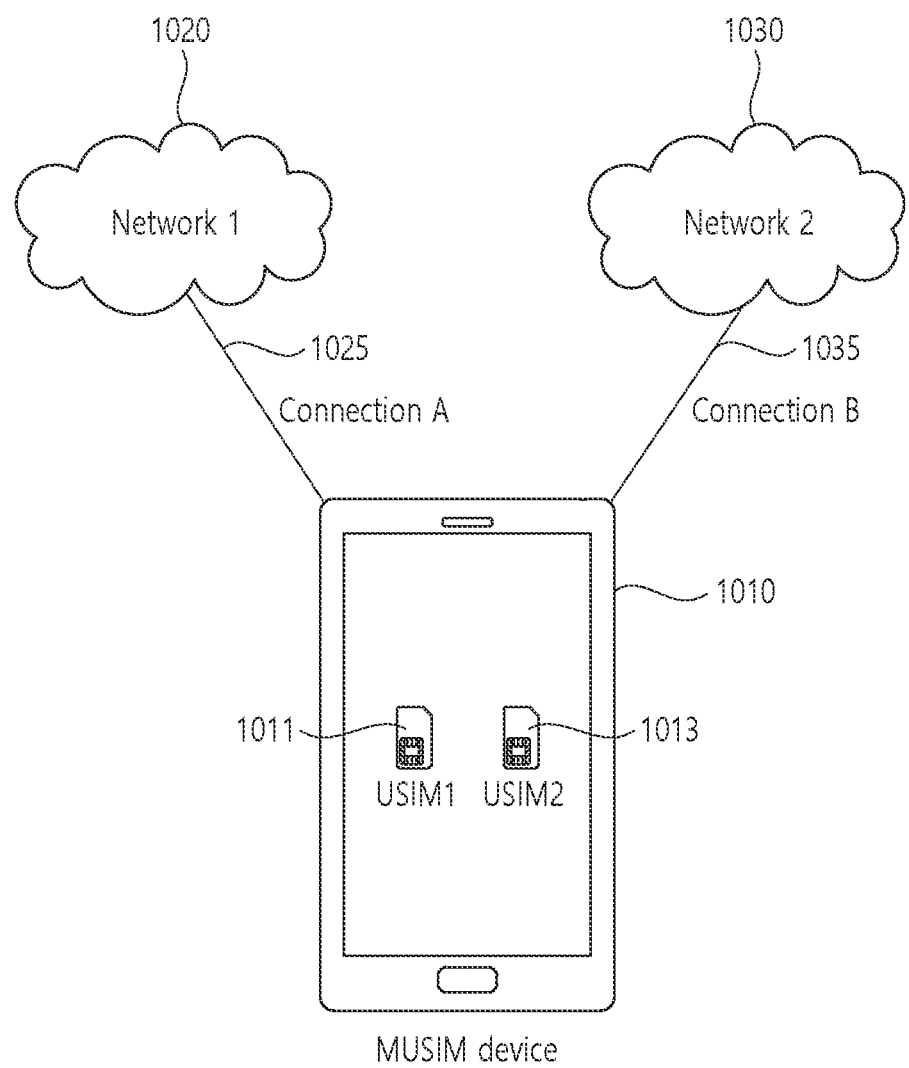
FIG. 10 shows an example of a wireless environment in which a MUSIM device operates according to an embodiment of the present disclosure.

FIG. 10 shows an example of a wireless environment in which a MUSIM device operates according to an embodiment of the present disclosure.

Referring to FIG. 10, MUSIM device 1010 (or, MUSIM UE 1010) may have a plurality of universal subscriber identity modules (USIMs)—USIM1 1011 and USIM2 1013. The MUSIM device 1010 may register to a network 1 1020 based on subscription information in the USIM1 1011 to obtain a connection A 1025 between the network 1 1020 and the MUSIM device 1010. The MUSIM device 1010 may also register to a network 2 1030 based on subscription information in the USIM2 1013 to obtain a connection B 1035 between the network 2 1030 and the MUSIM device 1010. The MUSIM device 1010 may use the USIM1 1011 to perform a communication with the network 1 1020 over the connection A 1025, and use the USIM2 1013 to perform a communication with the network 2 1030 over the connection B 1035.

In a wireless environment in which a MUSIM device operates, the following properties may hold:
- Each registration from the USIMS of a MUSIM device may be handled independently.
- Each registered USIM in the MUSIM device may be associated with a dedicated international mobile equipment identity (IMEI)/permanent equipment identifier (PEI).
- A MUSIM UE may be connected with i) evolved packet system (EPS) on one USIM and 5G system (5GS) on the other USIM; ii) EPS on both USIMs; or iii) 5GS on both USIMs.
- A MUSIM UE may be a single reception (RX)/dual RX/single transmission (TX)/Dual TX UE. Single RX may allow the MUSIM UE to receive traffic from only one network at one time. Dual RX may allow the MUSIM UE to simultaneously receive traffic from two networks. Single TX may allow the MUSIM UE to transmit traffic to one network at one time. Dual TX may allow the MUSIM UE to simultaneously transmit traffic to two networks. The terms single RX/TX and Dual RX/TX do not refer to a device type. A single UE may, as an example, use Dual TX in some cases but Single TX in other case.
- If/when the multiple USIMs in the MUSIM device are served by different serving networks, network coordination between the serving networks may not be required.
- A MUSIM device with different USIMs may be camping with all USIMs on the same serving network RAN node, or the MUSIM device may be camping on different serving networks RAN nodes.
- USIMs may belong to same or different operators. Coordination between involved operators may not be required.
- USIM may be a physical SIM or embedded SIM (eSIM).

While actively communicating with a first system/network, a MUSIM UE may need to periodically monitor a second system/network (e.g. to synchronize, read the paging channel, perform measurements, or read the system information). The periodical activity on the second system may or may not have performance impact on the first system the UE is communicating with, depending on the UE implementation (i.e., single reception (Rx) or dual Rx).

In some cases, the UE equipped with different USIMs may have paging collisions which results in missed paging. When the UE receives a page in the second system while actively communicating with the first system, the UE may need to decide whether the UE should respond to this paging or not. When the UE decides to respond to the paging in the second system, the UE may need to stop the current activity in the first system. For example the first system may suspend or release the ongoing connection with the UE.

A MUSIM device may have concurrent registrations over networks associated with multiple USIMs.

While actively communicating with a system associated with one USIM (e.g., current system and/or first system), the MUSIM device may need to perform some activity (e.g., listen to paging, respond to paging, perform mobility update etc.) in the other system(s) associated with other USIM(s) (i.e., second system(s)). While the MUSIM device communicates with another system, there may be interruption to the ongoing services in the current system.

Therefore, an aspect of the present disclosure is to handle a mobile-terminated (MT) service for a MUSIM device with the aim of avoiding any unnecessary interruptions of the service in the current system and saving system resources.

Another aspect of the present disclosure is to prevent the other system, which triggered the paging message, from performing undesirable operations (e.g., wasting resources, reaching misleading assumption of reachability, etc.).

The above aspects shall be considered for both EPS and 5GS. For 5GS, the cases where the MUSIM device in the current system is in either IDLE state or RRC Inactive state shall be considered.

In the present disclosure, to prevent unnecessary data interruption while MUSIM operation, the UE doesn't initiate leaving procedure on the current network/system (e.g., first network/system) and the UE may start a timer (e.g., release timer/data inactivity timer upon reception of a paging message from another network/system (e.g., second network/system)). For example, upon receiving a paging from a second network/system, the UE does not immediately trigger/initiate switch from the first network/system to the second network/system, and the UE may start a timer (e.g., data inactivity timer/release timer). The UE may start the timer, especially if a priority of a service indicated by the paging received from the other network isn't higher than (e.g., equal to or lower than) a priority of the on-going service on the current network. The UE may check the priority of the service indicated by the paging received from the other network. While the timer is running, the UE doesn't initiate leaving procedure (e.g., RRC Connection Release procedure) on the current network even though more paging messages indicating the priority of the service which isn't higher than the priority of the on-going service on the current network are received from the other network. When the timer expires, the UE may release the RRC connection on the current network and send a request of RRC connection to the other network if the paging message is available (e.g., another network is still sending a paging message).

Figure 11:
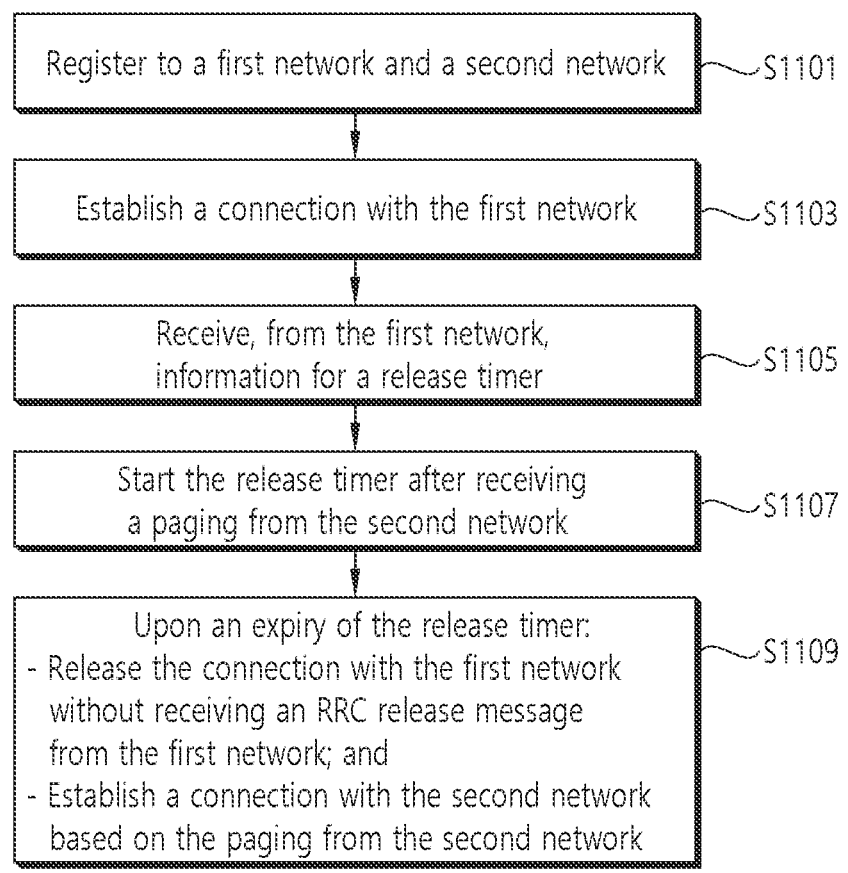
FIG. 11 shows an example of a method for releasing a connection in MUSIM operations according to an embodiment of the present disclosure.

FIG. 11 shows an example of a method for releasing a connection in MUSIM operations according to an embodiment of the present disclosure. Steps illustrated in FIG. 11 may be performed by a wireless device and/or a UE.

Referring to FIG. 11, in step S1101, the wireless device may register to a first network and a second network.

In step S1103, the wireless device may establish a connection with the first network.

In step S1105, the wireless device may receive, from the first network, information for a release timer.

In step S1107, the wireless device may start the release timer after receiving a paging from the second network.

In step S1109, upon an expiry of the release timer, the wireless device may: release the connection with the first network without receiving an RRC release message from the first network; and establish a connection with the second network based on the paging from the second network.

According to various embodiments, the wireless device may be equipped with a multi-universal subscriber identity module (MUSIM) including a first SIM and a second SIM. The wireless device may register to the first network based on the first SIM and the second network based on the second SIM.

According to various embodiments, the paging may initiate a SIM change from the first SIM to the second SIM. The wireless device may perform the SIM change from the first SIM to the second SIM upon an expiry of the release timer. The SIM change from the first SIM to the second SIM may comprise: releasing the connection with the first network without receiving an RRC release message from the first network; and establishing a connection with the second network based on the paging from the second network.

According to various embodiments, the wireless device may receive, from the first network, information for a scheduling gap. The wireless device may monitor the paging from the second network in the scheduling gap.

According to various embodiments, while the connection with the first network is maintained: the wireless device may be in a connected mode for the first network; and the wireless device may be in a non-connected mode for the second network. The non-connected mode may comprise at least one of an idle mode, or an inactive mode.

According to various embodiments, the wireless device may compare a highest priority among priorities of one or more first services and a priority of a second service. The wireless device may start the release timer based on that the priority of the second service is lower than or equal to the highest priority among the priorities of the one or more first services. The one or more first services may be services established in the first network. The second service may be a service to be initiated in the second network by the paging from the second network.

According to various embodiments, the wireless device may receive, from the second network, information for the priority of the second service in at least one of the paging or a paging monitoring period in which the paging is monitored.

According to various embodiments, the information for the priority of the second service may comprise a cause value of the second network sending the paging to the wireless device. The wireless device may be configured with a mapping relationship between a plurality of cause values and priorities of services. The wireless device identify the priority of the second service corresponding to the cause value based on the mapping relationship.

According to various embodiments, the information for the priority of the second service may comprise a value of the priority of the second service.

According to various embodiments, the priorities of the one or more first services may be determined based on at least one of a protocol data unit (PDU) session related to the one or more first services, or a bearer related to the one or more first services.

According to various embodiments, while the release timer is running after receiving the paging from the second network, the wireless device may:

delay to establish the connection with the second network; and the connection with the first network is maintained.

According to various embodiments, the wireless device may transmit, to the first network, information informing a connection switching from the first network to the second network.

According to various embodiments, the wireless device may register to a first network and a second network. The wireless device may establish a connection with the first network. The wireless device may receive timer information from the first network. The wireless device may receive a first service on the first network. The wireless device may receive a paging message from the second network. The paging message may indicate the wireless device to switch the connection from the first network to the second network. The wireless device may check a priority of the first service on the first network and a priority of a second service to be served by the second network. The wireless device may start a timer set to the timer information based on the priority of the first service and the priority of the second service. While the timer is running, the wireless device may maintain the connection with the first network. Upon expiry of the timer, the wireless device may release the connection with the first network and establishing a connection with the second network according to the paging message.

Figure 12:
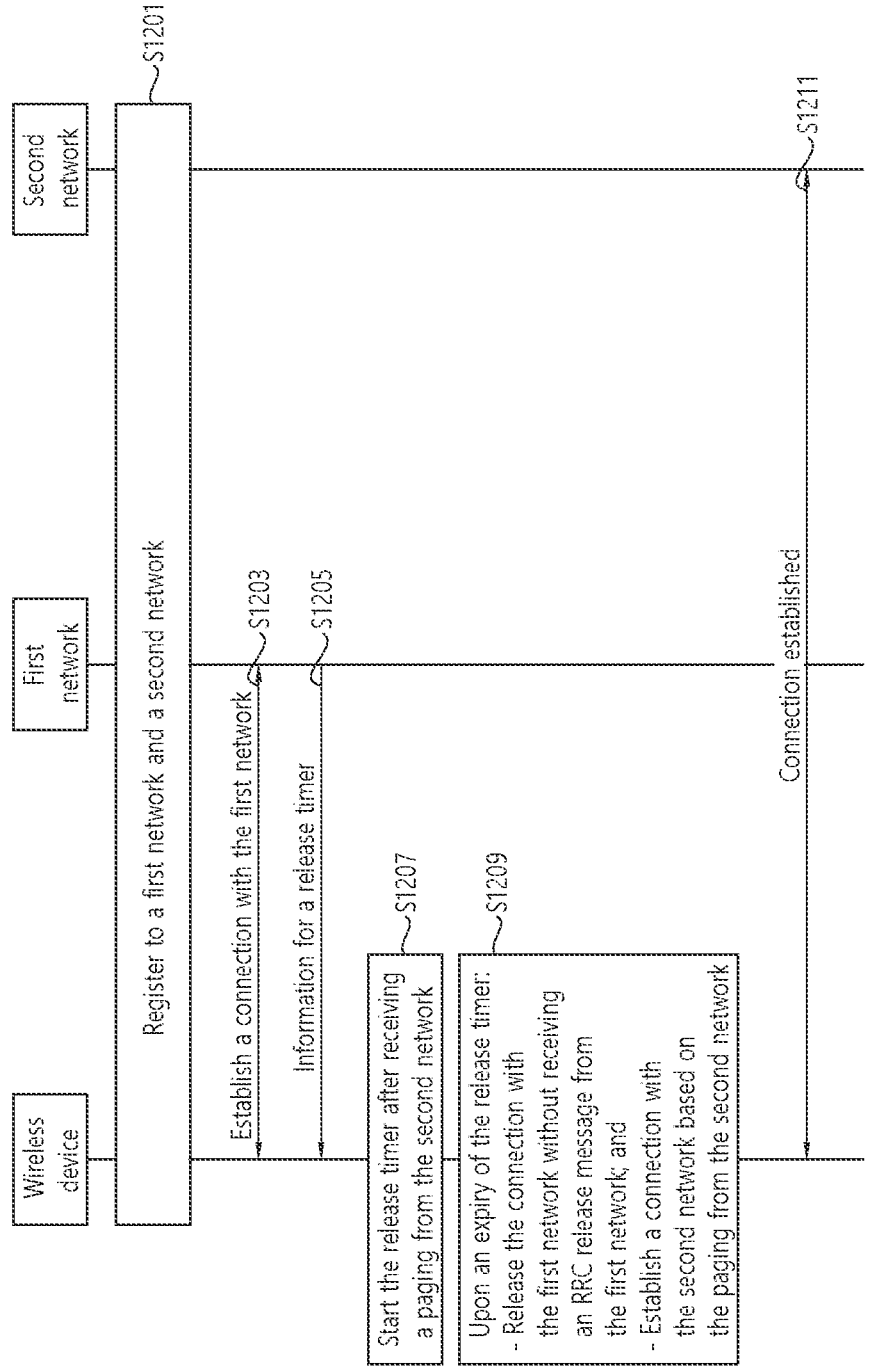
FIG. 12 shows an example of a signal flow for releasing a connection in MUSIM operations according to an embodiment of the present disclosure.

FIG. 12 shows an example of a signal flow for releasing a connection in MUSIM operations according to an embodiment of the present disclosure.

Referring to FIG. 12, in step S1201, a base station (BS) in the first network may perform at least part of a procedure for registering the wireless device in the first network and the second network.

In step S1203, the BS may establish a connection with the wireless device.

In step S1205, the BS may transmit, to the wireless device, information for a release timer.

In step S1207, the wireless device may start the release timer after receiving a paging from the second network.

In step S1209, upon an expiry of the release timer, the wireless device may: release the connection with the first network without receiving an RRC release message from the first network; and establishing a connection with the second network based on the paging from the second network.

In step S1211, connection between the wireless device and the second network is established.

The BS in FIG. 12 may be an example of a second device 220 in FIG. 2, and therefore, steps of the BS as illustrated in FIG. 12 may be implemented by the second device 220. For example, the processor 221 may be configured to perform at least part of a procedure for registering the wireless device in the first network and the second network. The processor 221 may be configured to establish a connection with the wireless device. The processor 221 may be configured to control the transceiver 223 to transmit, to the wireless device, information for a release timer. The wireless device may be configured to start the release timer after receiving a paging from the second network. Upon an expiry of the release timer, the wireless device may be configured to: release the connection with the first network without receiving an RRC release message from the first network; and establishing a connection with the second network based on the paging from the second network.

Figure 13:
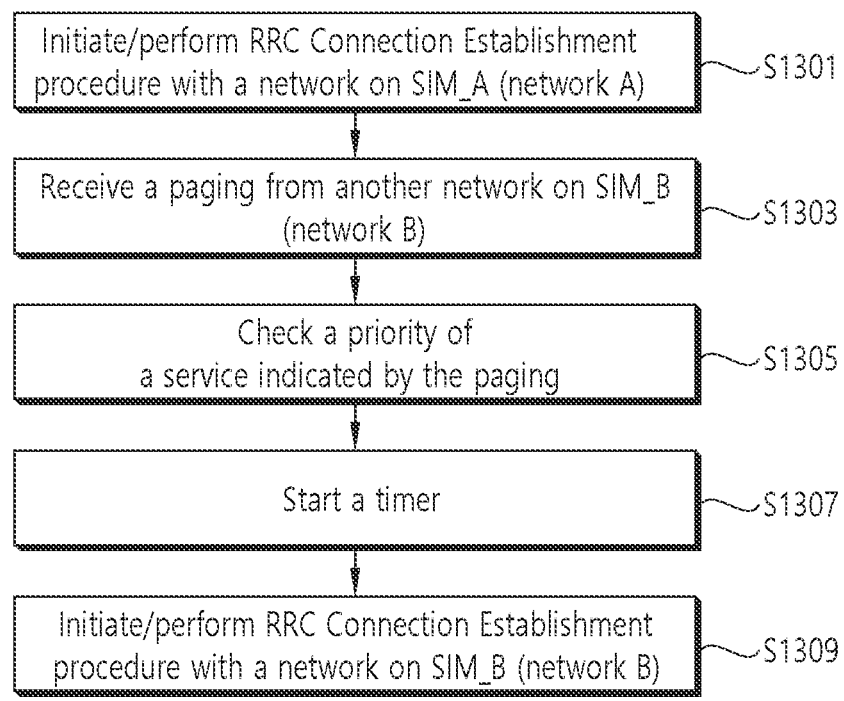
FIG. 13 shows an example of a method for paging handling in MUSIM operations according to an embodiment of the present disclosure.

FIG. 13 shows an example of a method for paging handling in MUSIM operations according to an embodiment of the present disclosure. Steps illustrated in FIG. 13 may be performed by a UE and/or wireless device.

Referring to FIG. 13, in step S1301, the UE may initiate/perform RRC Connection Establishment procedure with a network on SIM_A (network A). The UE may be in a non-connected mode for network B on SIM_B.

The UE which is capable of supporting MUSIM operations may initiate the RRC Connection establishment procedure to network A on SIM_A.

The UE may be configured with a timer value (i.e., release timer/inactivity timer) or equivalent information. The information for the timer may be provided by a dedicated RRC signalling from the network A after the RRC connection establishment (but desirably before the reception of the paging message from network B on SIM_B). Otherwise, the information for the timer may be provided by broadcast information (e.g., system information) or pre-configured information between the UE and the network.

A single timer may be configured. Alternatively, multiple timer values may be configured, where different time values may be respectively mapped to different services on the network B. For instance, a shorter timer value may be mapped to more important services on the network B. Alternatively, multiple timer values may be configured, where different time values may be mapped to different services of the network A. For instance, a shorter timer value may be mapped to less important services on the network A.

In step S1303, the UE may receive a paging from another network on SIM_B (network B). The UE may be in a connected mode for network A on SIM_A, and the UE may be in a non-connected mode for network B on SIM_B.

After RRC Connection establishment on the network A, the UE may receive a scheduling gap information from the network A. The UE may monitor paging information from network B using the scheduling gap information. For example, the UE may receive information for a scheduling gap from the network A, and monitor a paging from the network B in the scheduling gap. For paging monitoring on the network B, the scheduling gap information may be also provided by broadcast signalling (e.g., system information), dedicated signalling or may be pre-configured between the network A and the UE. While maintaining the RRC Connection on the network A, the UE may receive a paging message from network B.

In step S1305, the UE may check a priority of a service indicated by the paging. The UE may be in a connected mode for network A on SIM_A, and the UE may be in a non-connected mode for network B on SIM_B.

The UE may check a priority of a service indicated by the paging message received from network B.

The UE may use the priority information to evaluate whether the service indicated by the paging message on the network B is higher than all on-going/established services on the network A. If multiple services are provided on the network A, the UE may evaluate comparison between a priority of the service indicated by the paging on the network B and a priority of the service on the network A which has the highest priority among the multiple services provided on the network A. The network (e.g., network A and/or B) may provide the priority information to indicate the priority of a service indicated by the paging message. The priority information may be provided in the paging message or paging monitoring period.

The priority information may be a cause value indicating why the network (e.g., network B) is sending paging messages for the UE. The UE may be configured with mapping between cause values and priorities of the services. If the UE receives the cause value as the priority information, the UE can know the purpose of the paging message and decide which service should be considered to have a higher priority between two networks among the services—one on-going on the network A and the other(s) to be initiated on the network B.

The priority information may be a priority value which is determined by a network (e.g., network B). If the UE receives the priority value as the priority information, the UE may just compare the priority of the services, one on-going on the network A and the other(s) to be initiated on the network B, using the received priority values.

If the network A and/or B doesn't provide a priority value, the decision of the service priority on the network A and/or B may be up to UE implementation. The priority of a service can be determined by a policy that is pre-provisioned by network. For instance, a priority may be assigned to a PDU session carrying out the concerned service. Or a priority value may be assigned to a bearer carrying out the concerned service. Alternatively, the priority of a service can be determined by a user based on user configuration or preference.

In step S1307, the UE may start a timer. The UE may be in a connected mode for the network A on the SIM_A, and the UE may be in a non-connected mode for the network B on the SIM_B.

After the priority check in step S1305, if the UE cannot determine which service has a higher priority among on-going service on the network A and to-be-initiated service on the network B or the priority of the to-be-initiated service indicated by the paging on the network B isn't higher than (i.e., lower than or equal to) the on-going service on the network A, the UE may start a timer (e.g., release timer) to delay switching of the connection (i.e., SIM service change) from the network A to the network B. While the timer is running, switching of the connection (i.e., SIM service change) from the network A to the network B may not be initiated/triggered, and the UE may maintain connection with the network A.

The timer may be a newly defined timer. Alternatively, the existing timer such as data inactivity timer can be reused. Even in the case of the new timer, the timer may operate as the data inactivity timer. For example, the timer may be restarted whenever data is transmitted or received between the UE and the network (e.g., network A). If the data inactivity timer is reused for this case, the network may provide additional information so that the UE doesn't start the data inactivity timer immediately after reception of the timer information and start the timer after priority check of an incoming paging message from another network.

In step S1309, the UE may initiate/perform RRC Connection Establishment procedure with a network on SIM_B (network B). The UE may be in a non-connected mode for the network A on the SIM_A.

After the expiry of the timer, the UE may switch RRC connection according to the paging message received from the network B. For switching RRC Connection, the UE may autonomously release/suspend the RRC Connection on the network A, without reception of the RRC Connection Release message from the network A and initiate the RRC Connection establishment procedure to the network B. That is, the UE may be allowed to perform switching to RRC_IDLE or RRC_INACTIVE if the UE does not receive an RRC release message within a certain time period (e.g., release timer/inactivity timer) configured by a network. Before autonomously releasing the RRC Connection on the network A, the UE may inform the network A that RRC connection switching (e.g., SIM change) from the network A to the network B will be occurred. In another example, after autonomously releasing the RRC Connection on the network A, the UE may inform the network A an RRC connection switching from the network A to the network B.

Figure 14:
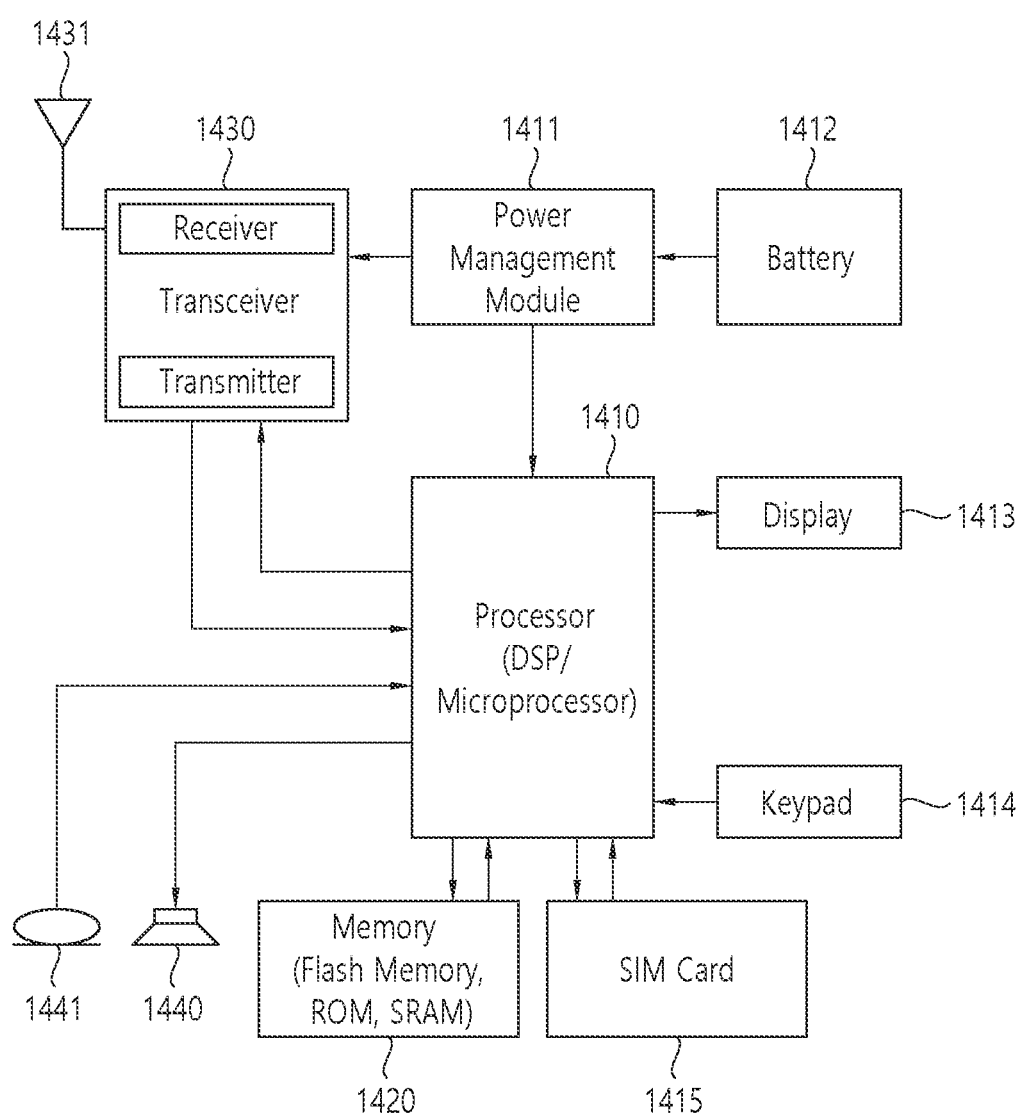
FIG. 14 shows a UE to implement an embodiment of the present disclosure.

FIG. 14 shows a UE to implement an embodiment of the present disclosure. The present disclosure described above for UE side may be applied to this embodiment. The UE in FIG. 14 may be an example of first device 214 as illustrated in FIG. 2.

A UE includes a processor 1410 (i.e., processor 211), a power management module 1411, a battery 1412, a display 1413, a keypad 1414, a subscriber identification module (SIM) card 1415, a memory 1420 (i.e., memory 212), a transceiver 1430 (i.e., transceiver 213), one or more antennas 1431, a speaker 1440, and a microphone 1441.

The processor 1410 may be configured to implement proposed functions, procedures and/or methods described in this description. Layers of the radio interface protocol may be implemented in the processor 1410. The processor 1410 may include application-specific integrated circuit (ASIC), other chipset, logic circuit and/or data processing device. The processor 1410 may be an application processor (AP). The processor 1410 may include at least one of a digital signal processor (DSP), a central processing unit (CPU), a graphics processing unit (GPU), a modem (modulator and demodulator). An example of the processor 1410 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1410 may be configured to, or configured to control the transceiver 1430 to implement steps performed by the UE and/or the wireless device throughout the disclosure.

The power management module 1411 manages power for the processor 1410 and/or the transceiver 1430. The battery 1412 supplies power to the power management module 1411. The display 1413 outputs results processed by the processor 1410. The keypad 1414 receives inputs to be used by the processor 1410. The keypad 1414 may be shown on the display 1413. The SIM card 1415 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1420 is operatively coupled with the processor 1410 and stores a variety of information to operate the processor 1410. The memory 1420 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1420 and executed by the processor 1410. The memory 1420 can be implemented within the processor 1410 or external to the processor 1410 in which case those can be communicatively coupled to the processor 1410 via various means as is known in the art.

The transceiver 1430 is operatively coupled with the processor 1410, and transmits and/or receives a radio signal. The transceiver 1430 includes a transmitter and a receiver. The transceiver 1430 may include baseband circuitry to process radio frequency signals. The transceiver 1430 controls the one or more antennas 1431 to transmit and/or receive a radio signal.

The speaker 1440 outputs sound-related results processed by the processor 1410. The microphone 1441 receives sound-related inputs to be used by the processor 1410.

According to various embodiments, the processor 1410 may be configured to, or configured to control the transceiver 1430 to implement steps performed by the UE and/or the wireless device throughout the disclosure. For example, the processor 1410 may be configured to register to a first network and a second network. The processor 1410 may be configured to establish a connection with the first network. The processor 1410 may be configured to control the transceiver 1430 to receive, from the first network, information for a release timer. The processor 1410 may be configured to start the release timer after receiving a paging from the second network. Upon an expiry of the release timer, the processor 1410 may be configured to: release the connection with the first network without receiving an RRC release message from the first network; and establish a connection with the second network based on the paging from the second network.

According to various embodiments, the wireless device may be equipped with a multi-universal subscriber identity module (MUSIM) including a first SIM and a second SIM. The processor 1410 may be configured to register to the first network based on the first SIM and the second network based on the second SIM.

According to various embodiments, the paging may initiate a SIM change from the first SIM to the second SIM. The processor 1410 may be configured to perform the SIM change from the first SIM to the second SIM upon an expiry of the release timer. The SIM change from the first SIM to the second SIM may comprise: releasing the connection with the first network without receiving an RRC release message from the first network; and establishing a connection with the second network based on the paging from the second network.

According to various embodiments, the processor 1410 may be configured to control the transceiver 1430 to receive, from the first network, information for a scheduling gap. The processor 1410 may be configured to monitor the paging from the second network in the scheduling gap.

According to various embodiments, while the connection with the first network is maintained: the wireless device may be in a connected mode for the first network; and the wireless device may be in a non-connected mode for the second network. The non-connected mode may comprise at least one of an idle mode, or an inactive mode.

According to various embodiments, the processor 1410 may be configured to compare a highest priority among priorities of one or more first services and a priority of a second service. The processor 1410 may be configured to start the release timer based on that the priority of the second service is lower than or equal to the highest priority among the priorities of the one or more first services. The one or more first services may be services established in the first network. The second service may be a service to be initiated in the second network by the paging from the second network.

According to various embodiments, the processor 1410 may be configured to control the transceiver 1430 to receive, from the second network, information for the priority of the second service in at least one of the paging or a paging monitoring period in which the paging is monitored.

According to various embodiments, the information for the priority of the second service may comprise a cause value of the second network sending the paging to the wireless device. The wireless device may be configured with a mapping relationship between a plurality of cause values and priorities of services. The wireless device identify the priority of the second service corresponding to the cause value based on the mapping relationship.

According to various embodiments, the information for the priority of the second service may comprise a value of the priority of the second service.

According to various embodiments, the priorities of the one or more first services may be determined based on at least one of a protocol data unit (PDU) session related to the one or more first services, or a bearer related to the one or more first services.

According to various embodiments, while the release timer is running after receiving the paging from the second network, the processor 1410 may be configured to: delay to establish the connection with the second network; and the connection with the first network is maintained.

According to various embodiments, the processor 1410 may be configured to control the transceiver 1430 to transmit, to the first network, information informing a connection switching from the first network to the second network.

Figure 15:
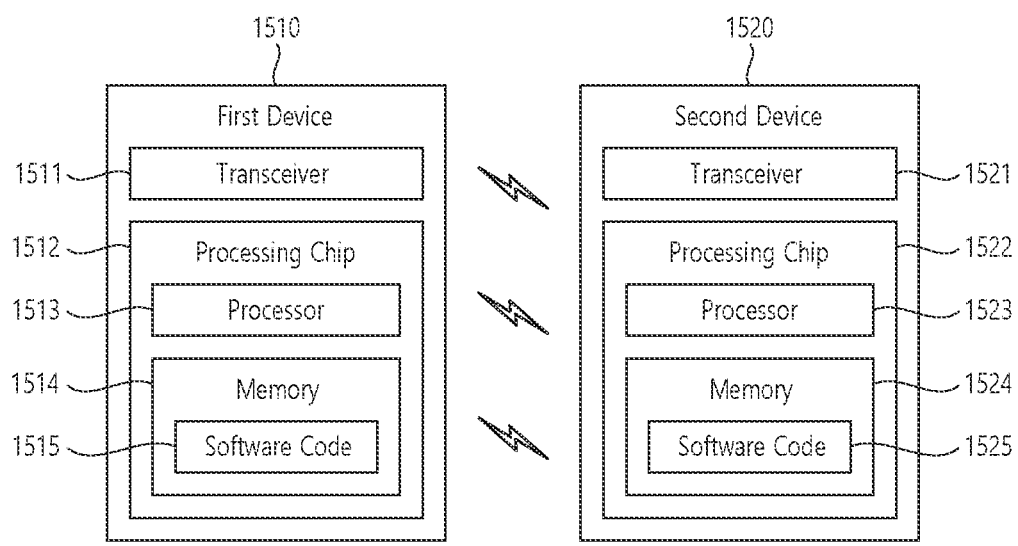
FIG. 15 shows another example of a wireless communication system to which the technical features of the present disclosure can be applied.

FIG. 15 shows another example of a wireless communication system to which the technical features of the present disclosure can be applied.

Referring to FIG. 15, the wireless communication system may include a first device 1510 (i.e., first device 210) and a second device 1520 (i.e., second device 220).

The first device 1510 may include at least one transceiver, such as a transceiver 1511, and at least one processing chip, such as a processing chip 1512. The processing chip 1512 may include at least one processor, such a processor 1513, and at least one memory, such as a memory 1514. The memory may be operably connectable to the processor 1513. The memory 1514 may store various types of information and/or instructions. The memory 1514 may store a software code 1515 which implements instructions that, when executed by the processor 1513, perform operations of the first device 910 described throughout the disclosure. For example, the software code 1515 may implement instructions that, when executed by the processor 1513, perform the functions, procedures, and/or methods of the first device 1510 described throughout the disclosure. For example, the software code 1515 may control the processor 1513 to perform one or more protocols. For example, the software code 1515 may control the processor 1513 to perform one or more layers of the radio interface protocol.

The second device 1520 may include at least one transceiver, such as a transceiver 1521, and at least one processing chip, such as a processing chip 1522. The processing chip 1522 may include at least one processor, such a processor 1523, and at least one memory, such as a memory 1524. The memory may be operably connectable to the processor 1523. The memory 1524 may store various types of information and/or instructions. The memory 1524 may store a software code 1525 which implements instructions that, when executed by the processor 1523, perform operations of the second device 1520 described throughout the disclosure. For example, the software code 1525 may implement instructions that, when executed by the processor 1523, perform the functions, procedures, and/or methods of the second device 1520 described throughout the disclosure. For example, the software code 1525 may control the processor 1523 to perform one or more protocols. For example, the software code 1525 may control the processor 1523 to perform one or more layers of the radio interface protocol.

According to various embodiments, the first device 1510 as illustrated in FIG. 15 may comprise a wireless device. The wireless device may comprise a transceiver 1511, a processing chip 1512. The processing chip 1512 may comprise a processor 1513, and a memory 1514. The memory 1514 may be operably connectable to the processor 1513. The memory 1514 may store various types of information and/or instructions. The memory 1514 may store a software code 1515 which implements instructions that, when executed by the processor 1513, perform operations comprising: registering to a first network and a second network; establishing a connection with the first network; receiving, from the first network, information for a release timer; starting the release timer after receiving a paging from the second network; and upon an expiry of the release timer: releasing the connection with the first network without receiving a radio resource control (RRC) release message from the first network; and establishing a connection with the second network based on the paging from the second network.

According to various embodiments, a non-transitory computer-readable medium may have stored thereon a plurality of instructions. The plurality of instructions, when executed by a processor of a wireless device, cause the wireless device to: register to a first network and a second network; establish a connection with the first network; receive, from the first network, information for a release timer; start the release timer after receiving a paging from the second network; and upon an expiry of the release timer: release the connection with the first network without receiving a radio resource control (RRC) release message from the first network; and establish a connection with the second network based on the paging from the second network.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 16:
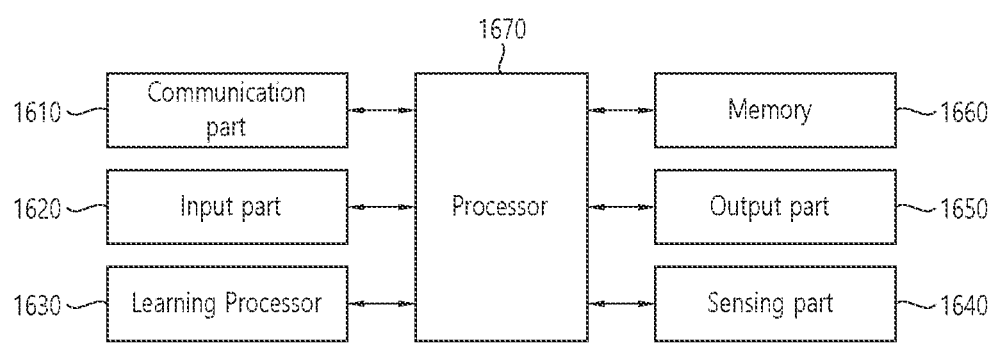
FIG. 16 shows an example of an AI device to which the technical features of the present disclosure can be applied.

FIG. 16 shows an example of an AI device to which the technical features of the present disclosure can be applied.

The AI device 1600 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 16, the AI device 1600 may include a communication part 1610, an input part 1670, a learning processor 1630, a sensing part 1640, an output part 1650, a memory 1660, and a processor 1670.

The communication part 1610 can transmit and/or receive data to and/or from external devices such as the AI devices and the AI server using wire and/or wireless communication technology. For example, the communication part 1610 can transmit and/or receive sensor information, a user input, a learning model, and a control signal with external devices. The communication technology used by the communication part 1610 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1670 can acquire various kinds of data. The input part 1670 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1670 can acquire input data to be used when acquiring an output using learning data and a learning model for model learning. The input part 1670 may obtain raw input data, in which case the processor 1670 or the learning processor 1630 may extract input features by preprocessing the input data.

The learning processor 1630 may learn a model composed of an ANN using learning data. The learned ANN can be referred to as a learning model. The learning model can be used to infer result values for new input data rather than learning data, and the inferred values can be used as a basis for determining which actions to perform. The learning processor 1630 may perform AI processing together with the learning processor of the AI server. The learning processor 1630 may include a memory integrated and/or implemented in the AI device 1600. Alternatively, the learning processor 1630 may be implemented using the memory 1660, an external memory directly coupled to the AI device 1600, and/or a memory maintained in an external device.

The sensing part 1640 may acquire at least one of internal information of the AI device 1600, environment information of the AI device 1600, and/or the user information using various sensors. The sensors included in the sensing part 1640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1650 may generate an output related to visual, auditory, tactile, etc. The output part 1650 may include a display unit for outputting visual information, a speaker for outputting auditory information, and/or a haptic module for outputting tactile information.

The memory 1660 may store data that supports various functions of the AI device 1600. For example, the memory 1660 may store input data acquired by the input part 1670, learning data, a learning model, a learning history, etc.

The processor 1670 may determine at least one executable operation of the AI device 1600 based on information determined and/or generated using a data analysis algorithm and/or a machine learning algorithm. The processor 1670 may then control the components of the AI device 1600 to perform the determined operation. The processor 1670 may request, retrieve, receive, and/or utilize data in the learning processor 1630 and/or the memory 1660, and may control the components of the AI device 1600 to execute the predicted operation and/or the operation determined to be desirable among the at least one executable operation. The processor 1670 may generate a control signal for controlling the external device, and may transmit the generated control signal to the external device, when the external device needs to be linked to perform the determined operation. The processor 1670 may obtain the intention information for the user input and determine the user's requirements based on the obtained intention information. The processor 1670 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1630 and/or learned by the learning processor of the AI server, and/or learned by their distributed processing. The processor 1670 may collect history information including the operation contents of the AI device 1600 and/or the user's feedback on the operation, etc. The processor 1670 may store the collected history information in the memory 1660 and/or the learning processor 1630, and/or transmit to an external device such as the AI server. The collected history information can be used to update the learning model. The processor 1670 may control at least some of the components of AI device 1600 to drive an application program stored in memory 1660. Furthermore, the processor 1670 may operate two or more of the components included in the AI device 1600 in combination with each other for driving the application program.

Figure 17:
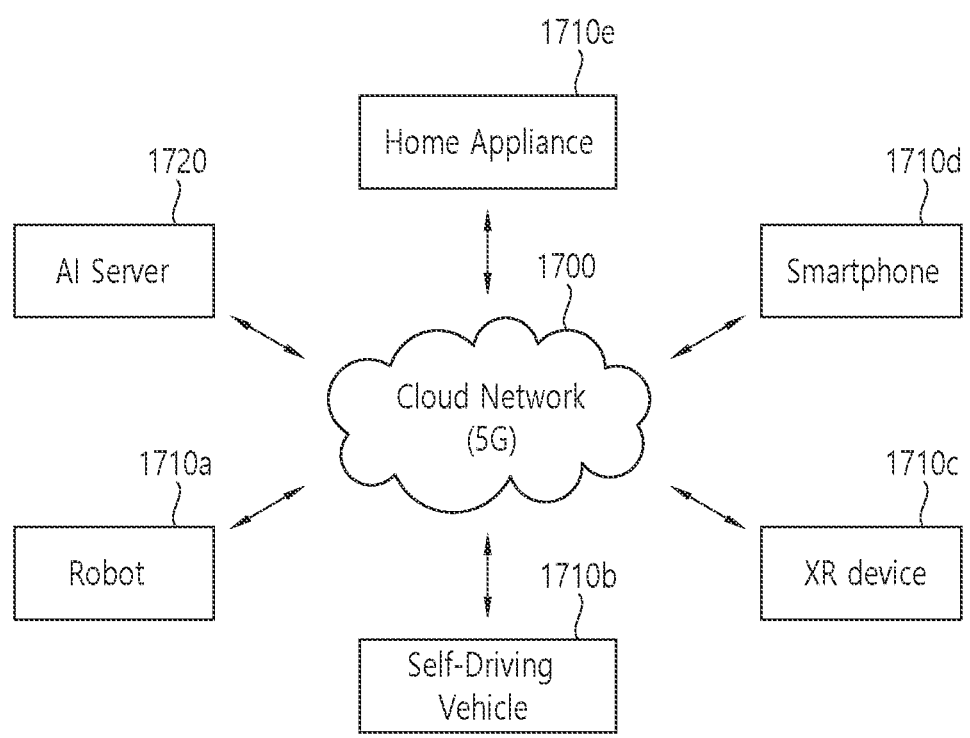
FIG. 17 shows an example of an AI system to which the technical features of the present disclosure can be applied.

FIG. 17 shows an example of an AI system to which the technical features of the present disclosure can be applied.

Referring to FIG. 17, in the AI system, at least one of an AI server 1720, a robot 1710a, an autonomous vehicle 1710b, an XR device 1710c, a smartphone 1710d and/or a home appliance 1710e is connected to a cloud network 1700. The robot 1710a, the autonomous vehicle 1710b, the XR device 1710c, the smartphone 1710d, and/or the home appliance 1710e to which the AI technology is applied may be referred to as AI devices 1710a to 1710e.

The cloud network 1700 may refer to a network that forms part of a cloud computing infrastructure and/or resides in a cloud computing infrastructure. The cloud network 1700 may be configured using a 3G network, a 4G or LTE network, and/or a 5G network. That is, each of the devices 1710a to 1710e and 1720 consisting the AI system may be connected to each other through the cloud network 1700. In particular, each of the devices 1710a to 1710e and 1720 may communicate with each other through a base station, but may directly communicate with each other without using a base station.

The AI server 1720 may include a server for performing AI processing and a server for performing operations on big data. The AI server 1720 is connected to at least one or more of AI devices constituting the AI system, i.e. the robot 1710a, the autonomous vehicle 1710b, the XR device 1710c, the smartphone 1710d and/or the home appliance 1710e through the cloud network 1700, and may assist at least some AI processing of the connected AI devices 1710a to 1710e. The AI server 1720 can learn the ANN according to the machine learning algorithm on behalf of the AI devices 1710a to 1710e, and can directly store the learning models and/or transmit them to the AI devices 1710a to 1710e. The AI server 1720 may receive the input data from the AI devices 1710a to 1710e, infer the result value with respect to the received input data using the learning model, generate a response and/or a control command based on the inferred result value, and transmit the generated data to the AI devices 1710a to 1710e. Alternatively, the AI devices 1710a to 1710e may directly infer a result value for the input data using a learning model, and generate a response and/or a control command based on the inferred result value.

Various embodiments of the AI devices 1710a to 1710e to which the technical features of the present disclosure can be applied will be described. The AI devices 1710a to 1710e shown in FIG. 17 can be seen as specific embodiments of the AI device 1600 shown in FIG. 16.

The present disclosure can have various advantageous effects.

For example, from the data interruption perspective, the present disclosure may have a benefit for multiple USIM handling when the UE cannot prioritize between two networks i.e., the first network and the second network. The UE can keep data transmission from the first network even though a paging message which requires the UE to switch from the first network to the second network is received from the second network until on-going data transmission is completed on the first network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) with multi-universal subscriber identity module (MUSIM) in a wireless communication system, the method comprising:
   establishing a connection with a first network and entering a connected state in the first network;
   receiving, from the first network, information for a release timer for a MUSIM operation, wherein the release timer for the MUSIM operation is a timer for the UE to enter an idle state in the first network for the MUSIM operation;
   starting the release timer for the MUSIM operation based on a determination to leave the connected state in the first network;
   while the release timer for the MUSIM operation is running, performing a transmission to the first network and a reception from the first network;
   upon an expiry of the release timer for the MUSIM operation, entering the idle state in the first network without receiving a radio resource control (RRC) release message from the first network; and
   switching to the second network based on entering the idle state in the first network.

2. The method of claim 1, wherein the MUSIM include a first SIM and a second SIM, and
   wherein the registering to the first network and the second network comprises registering to the first network based on the first SIM and the second network based on the second SIM.

3. The method of claim 1, wherein the switching to the second network comprises establishing a connection with the second network based on receiving a paging from the second network.

4. The method of claim 1, further comprising:
   receiving, from the first network, information for a scheduling gap; and
   monitoring a paging from the second network in the scheduling gap.

5. The method of claim 1, wherein, while the connection with the first network is maintained:
   the UE is in the connected state in the first network; and
   the UE is in a non-connected state in the second network,
   wherein the non-connected state comprises at least one of the idle state, or an inactive state.

6. The method of claim 1, further comprising:
   comparing a highest priority among priorities of one or more first services and a priority of a second service,
   wherein the starting of the release timer for the MUSIM operation comprises:
   starting the release timer for the MUSIM operation based on the priority of the second service being lower than or equal to the highest priority among the priorities of the one or more first services,
   wherein the one or more first services are services established in the first network, and
   wherein the second service is a service to be initiated in the second network by a paging from the second network.

7. The method of claim 6, further comprising:
   receiving, from the second network, information for the priority of the second service in at least one of the paging or a paging monitoring period in which the paging is monitored.

8. The method of claim 7, wherein the information for the priority of the second service comprises a cause value of the second network sending the paging to the UE, wherein the UE is configured with a mapping relationship between a plurality of cause values and priorities of services, and wherein the method further comprises identifying the priority of the second service corresponding to the cause value based on the mapping relationship.

9. The method of claim 7, wherein the information for the priority of the second service comprises a value of the priority of the second service.

10. The method of claim 6, wherein the priorities of the one or more first services are determined based on at least one of a protocol data unit (PDU) session related to the one or more first services, or a bearer related to the one or more first services.

11. The method of claim 1, further comprising:
while the release timer for the MUSIM operation is running, maintaining the connection with the first network.

12. The method of claim 1, further comprising:
transmitting, to the first network, information related to leaving the connected state in the first network.

13. The method of claim 1, wherein the UE is in communication with at least one of a mobile device, a network, or autonomous vehicles other than the UE.

14. A user equipment (UE) with multi-universal subscriber identity module (MUSIM) configured to operate in a wireless communication system, the UE comprising:

a transceiver;
a memory; and
at least one processor operatively coupled to the transceiver and the memory,
wherein the memory stores instructions that, when executed by the at least one processor, perform operations comprising:
establishing a connection with a first network and entering a connected state in the first network;
receiving, from the first network, information for a release timer for a MUSIM operation, wherein the release timer for the MUSIM operation is a timer for a user equipment (UE) to enter an idle state in the first network for the MUSIM operation;
starting the release timer for the MUSIM operation based on a determination to leave the connected state in the first network;
while the release timer for the MUSIM operation is running, performing a transmission to the first network and a reception from the first network;
upon an expiry of the release timer for the MUSIM operation, entering the idle state in the first network without receiving a radio resource control (RRC) release message from the first network; and
switching to the second network based on entering the idle state in the first network.

* * * * *